(12) United States Patent
Seo et al.

(10) Patent No.: US 12,375,597 B2
(45) Date of Patent: Jul. 29, 2025

(54) ELECTRONIC DEVICE AND METHOD OF PROVIDING THE SAME

(71) Applicant: Samsung Display Co., Ltd., Yongin-si (KR)

(72) Inventors: Jeongweon Seo, Yongin-si (KR); Byunghoon Kim, Yongin-si (KR); Youngdo Kim, Yongin-si (KR); Junyoung Lee, Yongin-si (KR); Junwoo You, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 162 days.

(21) Appl. No.: 18/330,694

(22) Filed: Jun. 7, 2023

(65) Prior Publication Data

US 2024/0106924 A1 Mar. 28, 2024

(30) Foreign Application Priority Data

Sep. 28, 2022 (KR) .................. 10-2022-0123567

(51) Int. Cl.
*G06F 1/16* (2006.01)
*H04M 1/02* (2006.01)

(52) U.S. Cl.
CPC ........ *H04M 1/0264* (2013.01); *G06F 1/1656* (2013.01); *G06F 1/1686* (2013.01); *H04M 1/0266* (2013.01)

(58) Field of Classification Search
CPC .. H04M 1/0264; H04M 1/0266; H04M 1/026; H04M 2250/12; G06F 1/1656; G06F 1/1686; G06F 1/1637; H10K 59/00; H10K 50/844; H10K 71/00; C09J 5/00; C09J 2301/416
See application file for complete search history.

(56) References Cited

U.S. PATENT DOCUMENTS

| 9,403,236 | B2 | 8/2016 | Astle et al. |
| 10,852,861 | B2 * | 12/2020 | Kim ................. G06F 3/041 |
| 11,178,320 | B2 * | 11/2021 | Noh ................. H04M 1/0266 |
| 12,062,503 | B2 * | 8/2024 | Kanei ................. H01G 9/2081 |

FOREIGN PATENT DOCUMENTS

| KR | 100078099 | 10/1994 |
| KR | 102089335 B1 | 3/2020 |
| KR | 102253463 B1 | 5/2021 |

* cited by examiner

*Primary Examiner* — Anthony M Haughton
*Assistant Examiner* — Hung Q Dang
(74) *Attorney, Agent, or Firm* — CANTOR COLBURN LLP (57) ABSTRACT

An electronic device includes an electronic module which provides a function to the electronic device, a display panel comprising a first region, and a second region which is adjacent to the first region and corresponds to the electronic module, and a lower member below the display panel. The lower member includes an adhesive layer including a first adhesive portion which corresponds to the first region of the display panel and has an adhesive strength, and a second adhesive portion which corresponds to the second region of the display panel and has an adhesive strength lower than that of the first adhesive portion, together with a functional layer which is directly below the first adhesive portion and includes a plurality of fillers which are in a base layer and have an average diameter of about 10 micrometers to about 70 micrometers.

9 Claims, 9 Drawing Sheets

ELECTRONIC DEVICE AND METHOD OF PROVIDING THE SAME

This application claims priority to Korean Patent Application No. 10-2022-0123567, filed on Sep. 28, 2022, and all the benefits accruing therefrom under 35 U.S.C. § 119, the entire contents of which are hereby incorporated by reference.

BACKGROUND

(1) Field

The present disclosure herein relates to an electronic device and a method of manufacturing (or providing) thereof. More particularly, the present disclosure herein relates to an electronic device having a reduced thickness and improved efficiency in manufacturing thereof, and a method of manufacturing (or providing) the same.

(2) Description of the Related Art

An electronic device may be composed of various electronic components, such as a display panel configured to display an image and an electronic module configured to perform various functions. The display panel includes a light-emitting element configured to generate light.

The electronic module may include a camera, an infrared sensor, a proximity sensor, and the like. The electronic module may be disposed below the display panel. The transmittance of a partial region of the display panel may be higher than the transmittance of another partial region of the display panel. The electronic module may receive or output an optical signal through a region having a high transmittance.

SUMMARY

The present disclosure provides an electronic device having a lower member below a display panel, and a method of manufacturing (or providing) the same.

An embodiment of the invention provides an electronic device including a display panel including a first region and a second region adjacent to the first region, a lower member disposed below the display panel so as to overlap the first region, and an electronic module disposed below the lower member so as to overlap the second region, where the lower member includes an adhesive layer including a first adhesive portion disposed below the display panel so as to overlap the first region and a second adhesive portion disposed below the display panel so as to overlap the second region, and a functional layer disposed directly below the first adhesive portion, where the functional layer includes a base layer and a plurality of fillers having an average diameter of about 10 micrometers to about 70 micrometers, and the adhesive strength of the first adhesive portion is higher than that of the second adhesive portion.

In an embodiment, the functional layer may not be disposed below the second adhesive portion, and the functional layer may have a viscosity of about 10,000 cps to about 100,000 cps. The thickness of the functional layer may be about 50 micrometers to about 300 micrometers. The base layer may contain an organic material.

In an embodiment, the lower member may be disposed directly below the display panel, and the lower member may include the adhesive layer and the functional layer.

In an embodiment, the electronic module may be a camera module or a sensor module.

In an embodiment of the invention, an electronic device includes a display panel including a first region and a second region adjacent to the first region, a lower member disposed directly below the display panel so as to overlap the first region, and an electronic module disposed below the lower member so as to overlap the second region, where the lower member includes an adhesive layer disposed directly below the display panel, and a functional layer disposed directly below the adhesive layer so as to overlap the first region and so as not to overlap the second region and having a viscosity of about 10,000 cps to about 100,000 cps, where the functional layer includes a plurality of fillers having an average diameter of about 10 micrometers to about 70 micrometers.

In an embodiment of the invention, a method for manufacturing an electronic device includes providing a display panel including a first region and a second region adjacent to the first region and corresponding to an electronic module, forming, on the lower surface of the display panel, an adhesive layer including a first adhesive portion overlapping the first region and a second adhesive portion overlapping the second region, forming, on the lower surface of the adhesive layer, a preliminary functional layer including a first preliminary functional portion overlapping the first region and a second preliminary functional portion overlapping the second region, and removing the second preliminary functional portion from the lower surface of the adhesive layer, where the adhesive strength of the first adhesive portion is higher than that of the second adhesive portion.

In an embodiment, the forming of the adhesive layer in the method for manufacturing the electronic device may include forming, on the lower surface of the display panel, a preliminary adhesive layer including a first preliminary adhesive portion overlapping the first region and a second preliminary adhesive portion overlapping the second region, and forming the second adhesive portion by weakening the adhesive strength of the second preliminary adhesive portion.

In an embodiment, the forming of the second adhesive portion may include irradiating the second preliminary adhesive portion with light. The light may be ultraviolet light.

In an embodiment, the forming of the adhesive layer may include forming the first adhesive portion and forming the second adhesive portion on the lower surface of the display panel, and a material included in the first adhesive portion may be different from a material included in the second adhesive portion.

In an embodiment, the preliminary functional layer may include a plurality of fillers having a diameter of about 10 micrometers to about 70 micrometers and have a viscosity of about 10,000 cps to about 100,000 cps.

In an embodiment, the forming of the preliminary functional layer may be performed through a printing process.

In an embodiment, the preliminary functional layer may include a curable resin, and after the forming of the preliminary functional layer, the method may further include curing the preliminary functional layer prior to the removing of the second preliminary functional portion.

In an embodiment, the second preliminary functional portion may be adjacent to the first preliminary functional portion, and the removing of the second preliminary functional portion may include irradiating, with light, a boundary between the first preliminary functional portion and the second preliminary functional portion.

In an embodiment, the preliminary functional layer may include a front region corresponding to the display panel and a corner region extending from the front region, and the preliminary functional layer may include a central portion formed to overlap the front region and a corner portion formed to overlap the corner region.

In an embodiment, the method may further include removing the corner portion after the forming of the preliminary functional layer.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

In this specification, it will be understood that when an element (or region, layer, portion, etc.) is referred to as being related to another element such as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of components are exaggerated for effective description of the technical features.

The terminology used herein is for the purpose of describing particular embodiments only and is not intended to be limiting. For example, a reference number labeling a singular form of an element within the figures may be used to reference a plurality of the singular element within the text of the disclosure. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations that the associated components can define.

It will be understood that, although the terms first, second, etc. may be used herein to describe various elements, these elements should not be limited by these terms. These terms are only used to distinguish one element from another element. For example, a first element could be termed a second element without departing from the scope of the invention. Similarly, the second element may also be referred to as the first element. The terms of a singular form include plural forms unless otherwise specified.

In addition, terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or combinations thereof, but do not preclude the presence or addition of one or more other features, integers, steps, operations, elements, components, and/or combinations thereof.

In this specification, the expression "being directly disposed" may mean that there is no layer, film, region, plate, or the like which is added between a part of a layer, film, region, plate, or the like and another part. For example, the expression "being directly disposed" may mean being disposed between two layers or two members without an additional member such as an adhesive member interposed therebetween. As being "directly disposed" or "directly on," for example, elements may be in contact with each other, such as to form an interface therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 1:
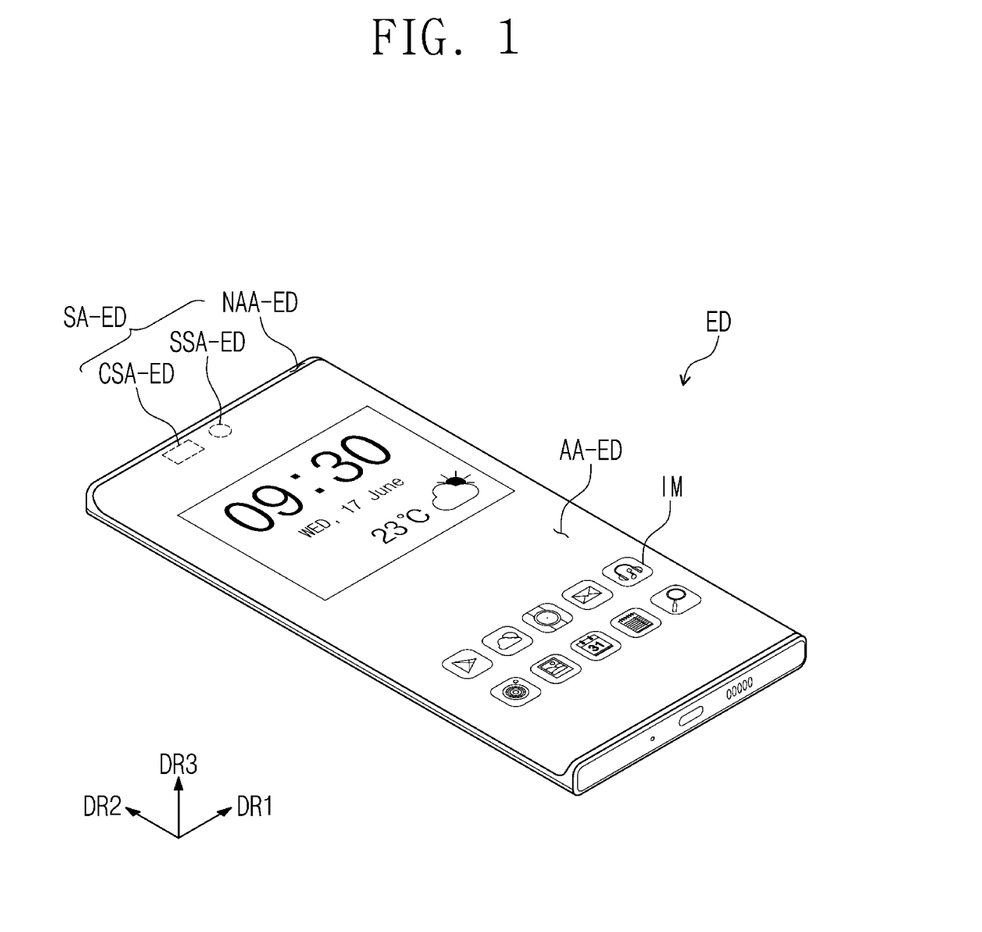
FIG. 1 is a perspective view of an electronic device according to an embodiment of the invention.
Figure 2:
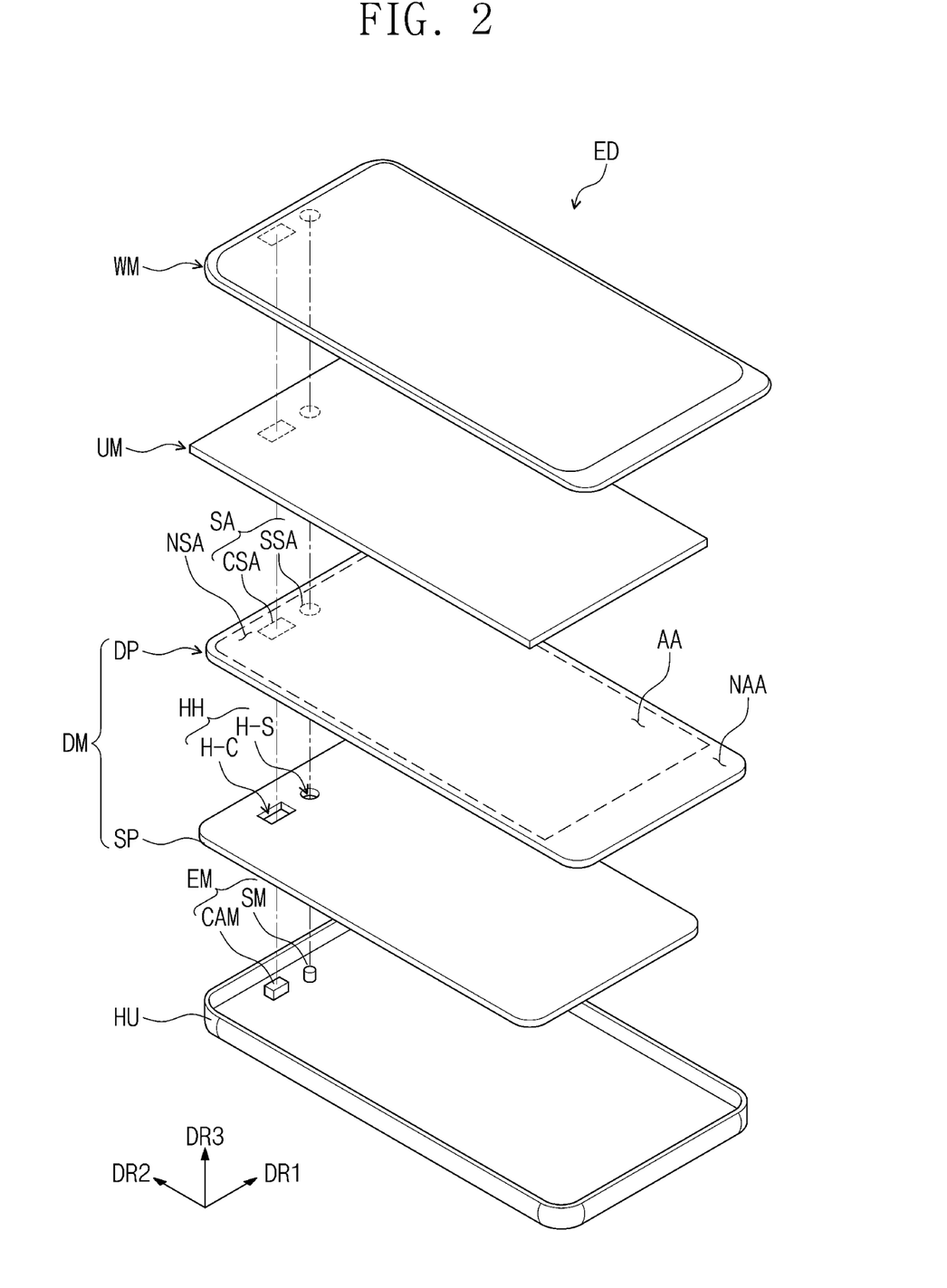
FIG. 2 is an exploded perspective view of the electronic device according to an embodiment of the invention.

FIG. 1 is a perspective view of an electronic device ED according to an embodiment of the invention. FIG. 2 is an exploded perspective view of the electronic device ED according to an embodiment of the invention.

The electronic device ED according to an embodiment of the invention may be activated according to an electrical signal. For example, the electronic device ED may be a mobile phone, a tablet, a car navigation system, a game machine, or a wearable device, but is not limited thereto. FIG. 1 exemplarily illustrates that the electronic device ED is a mobile phone.

The electronic device ED may display an image IM through an active region AA-ED. The active region AA-ED may include or be in a plane defined by a first direction DR1 and a second direction DR2 crossing each other. The active region AA-ED may further include a curved surface bent from at least one side of the plane defined by the first direction DR1 and the second direction DR2 crossing each other. The electronic device ED according to an embodiment illustrated in FIG. 1 is illustrated to include two curved surfaces respectively bent along a third direction DR3, from opposing sides of a plane defined by the first direction DR1 and the second direction DR2 crossing each other. However, the shape of the active region AA-ED is not limited thereto. For example, the active region AA-ED may include only a portion corresponding to the plane, may further include at least two or more, for example, four curved surfaces respectively bent from four sides of the plane, etc.

FIG. 1 and following drawings illustrate first to third directions DR1, DR2, and DR3, and directions indicated by the first to third directions DR1, DR2, and DR3 described herein are relative concepts and may be converted into other directions.

In this specification, the first direction DR1 and the second direction DR2 cross each other, and may be orthogonal to each other. The third direction DR3 may be a direction intersecting the plane defined by the first direction DR1 and the second direction DR2 crossing each other, such as being normal to the plane. In this specification, the expression "on a plane" may mean a view of a plane defined by the first direction DR1 and the second direction DR2 crossing each other, along a direction intersecting the plane such as the third direction DR3. A thickness direction may mean the third direction DR3 that is a direction intersecting, normal, etc. to the plane defined by the first direction DR1 and the second direction DR2 crossing each other.

A sensing region SA-ED may be defined in the electronic device ED. Although FIG. 1 exemplarily illustrates a camera sensing region CSA-ED and a sensor sensing region SSA-ED. The number of sensing regions SA-ED is not limited thereto, and in the electronic device ED, a single sensing region SA-ED or three or more sensing regions SA-ED may be defined. In addition, the sensing region SA-ED may be defined within the active region AA-ED so as to be a portion of the active region AA-ED.

An electronic module EM may overlap the sensing region SA-ED. The electronic module EM may receive an external input transmitted through the sensing region SA-ED from outside the electronic module EM and/or provide an output through the sensing region SA-ED to the outside of the electronic module EM. For example, a camera module CAM may overlap the camera sensing region CSA-ED, and a sensor module SM may overlap the sensor sensing region SSA-ED.

The electronic device ED may include an active region AA-ED and a peripheral region NAA-ED which is adjacent to the active region AA-ED. The active region AA-ED may correspond to a display region AA of a display panel DP which will be described later, and the peripheral region NAA-ED may correspond to a non-display region NAA of the display panel DP. That is, various components and layers of the electronic device ED may include an active region AA-ED, a peripheral region NAA-ED, a display region AA, a non-display region NAA, etc. corresponding to those described above.

The peripheral region NAA-ED may block an optical signal and be disposed outside the active region AA-ED, such as to surround the active region AA-ED in a plan view (e.g., a view of the plane defined by the first direction DR1 and the second direction DR2 crossing each other. In an embodiment of the invention, the peripheral region NAA-ED may be disposed on a side surface of the electronic device ED instead of the front surface thereof. In an embodiment of the invention, the peripheral region NAA-ED may be omitted.

The electronic device ED according to an embodiment of the invention may include a window WM, a housing HU, an electronic module EM, a display module DM, and an upper member UM.

The electronic device ED according to an embodiment of the invention may include a window WM disposed on the display panel DP. The window WM provides an outer surface of the electronic device ED. Although not illustrated, the window WM may include a window base substrate WM-BS and further include functional layers such as an anti-reflection layer, an anti-fingerprint layer, and an optical layer for controlling a phase.

In the electronic device ED according to an embodiment of the invention, the upper member UM may be disposed below the window WM and above the display module DM. The upper member UM may include an anti-reflection layer and an input detection sensor. The anti-reflection layer lowers the reflectance of external light. The input detection sensor detects an external input such as a user's external input. The upper member UM may further include an adhesive layer configured to bond the anti-reflection layer and the input detection sensor to each other.

In the electronic device ED according to an embodiment of the invention, the display module DM may be disposed below the upper member UM. The display module DM may include a display panel DP and a lower member SP.

The display panel DP may include a display region AA in which an image IM is displayed and a non-display region NAA which is adjacent to the display region AA. That is, the front surface of the display panel DP may include the display region AA together with the non-display region NAA. The display region AA may be activated according to an electrical signal.

The non-display region NAA may be adjacent to the display region AA. The non-display region NAA may surround the display region AA. A driving circuit or driving line (e.g., a signal line) for driving the display region AA, various signal lines or pads for providing an electrical signal to the display region AA, electronic elements, or the like may be disposed in the non-display region NAA.

The display panel DP may include a first region NSA and a second region SA. The second region SA may overlap the electronic module EM, and the first region NSA may be disposed to surround at least a portion of the second region SA. The second region SA may correspond to the sensing region SA-ED of the electronic device ED. The first region NSA may correspond to a remaining region of the display panel DP except for the second region SA thereof.

The second region SA may include a first signal transmission region CSA corresponding to the camera sensing region CSA-ED of the electronic device ED, and a second signal transmission region SSA corresponding to the sensor sensing region SSA-ED of the electronic device ED. Below the display panel DP, a camera module CAM may be disposed so as to overlap the first signal transmission region CSA, and a sensor module SM may be disposed so as to overlap the second signal transmission region SSA. Although not illustrated, a predetermined opening may be defined in one of the second regions SA of the display panel DP according to another embodiment of the invention. Accordingly, the opening may penetrate a thickness portion of the display panel DP.

FIG. 2 exemplarily illustrates that the second region SA includes the first signal transmission region CSA and the second signal transmission region SSA, but the number of the second regions SA is not limited thereto, and in the display panel DP, a single second region SA or three or more second regions SA may be defined. Although the planar shape of each of the second regions SA is exemplarily illustrated as a circle or a tetragon in FIG. 2, the planar shape of the second region SA is not limited thereto and may be variously defined.

On a plane, an area (e.g., a planar area) of the second region SA may be smaller than the area of the first region NSA. The transmittance (e.g., a light transmittance) of the first region NSA and the transmittance of the second region SA may be different from each other. The transmittance of the second region SA may be greater than that of the first region NSA.

In the display panel DP according to an embodiment of the invention, a portion of a driving circuit, a driving line, and the like as part of a pixel circuit for driving a pixel of the display panel DP (not shown) disposed in the second region SA may be disposed in the non-display region NAA or in a portion of the first region NSA which is adjacent to the second region SA. Accordingly, the line density of the second region SA may be lower than the line density of the first region NSA. However, the embodiment of the invention is not limited thereto, and the line density of the second region SA and the line density of the first region NSA may be substantially the same as each other. A line density may refer to a number and/or a planar area occupied by the circuit, line, etc. without being limited thereto.

The display panel DP may include a light-emitting element layer DP-ED (see FIG. 4) including an organic light-emitting element, a quantum dot light-emitting element, a micro LED light-emitting element, a nano LED light-emitting element, or the like. The light-emitting element layer DP-ED (see FIG. 4) may be configured to substantially generate an image.

The lower member SP may be disposed below the display panel DP. The lower member SP may support the display panel DP and perform a function of dissipating heat generated in the display panel DP.

In the electronic device ED according to an embodiment of the invention, the electronic module EM may be an electronic component configured to output or receive an optical signal. For example, the electronic module EM may include a camera module CAM and/or a sensor module SM. The camera module CAM may capture an external image by receiving external light through the camera sensing region CSA-ED. In addition, the sensor module SM may be a sensor such as a proximity sensor or an infrared light-emitting sensor configured to output or receive external light through the sensor sensing region SSA-ED.

In addition, the electronic device ED according to an embodiment of the invention may include a housing HU disposed below the electronic module EM. The electronic module EM, the display panel DP, and the like may be accommodated in the housing HU. In the electronic device ED according to an embodiment of the invention, the window WM and the housing HU may be coupled to each other to form the exterior of the electronic device ED.

Figure 3:
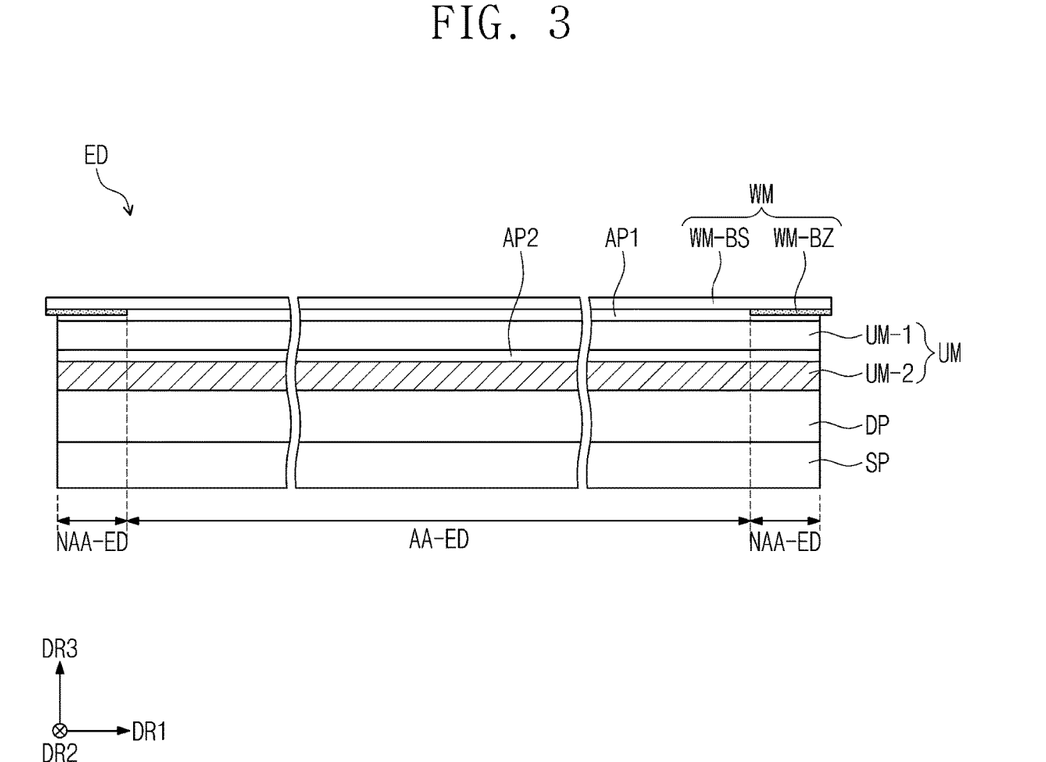
FIG. 3 is a cross-sectional view of the electronic device according to an embodiment of the invention.

FIG. 3 is a cross-sectional view illustrating a partial configuration of the electronic device ED according to an embodiment of the invention.

Referring to FIG. 3, the electronic device ED according to an embodiment of the invention may include a window WM, an upper member UM, a display panel DP, and a lower member SP. In an embodiment of the invention, the window WM may cover the front surface of the display panel DP. The window WM may include a window base substrate WM-BS and a bezel pattern WM-BZ. The window base substrate WM-BS includes a transparent base layer such as a glass substrate or a transparent film. The bezel pattern WM-BZ may have a multi-layered structure. The multi-layered structure may include a colored color layer and a black light blocking layer. The colored color layer and the black light blocking layer may be formed through deposition, printing, and coating processes. The bezel pattern WM-BZ may be omitted from the window WM and may be formed (or provided) on the upper member UM instead of the window base substrate WM-BS.

In an embodiment of the invention, the upper member UM includes an anti-reflection layer UM-1 and an input sensor UM-2 as an input-sensing layer. As illustrated in FIG. 3, the window WM and the anti-reflection layer UM-1 may be coupled to each other by a first adhesive layer AP1, and the anti-reflection layer UM-1 and the input sensor UM-2 may be coupled to each other by a second adhesive layer AP2.

The anti-reflection layer UM-1 may reduce the reflectance of external light. The anti-reflection layer UM-1 may include a retarder and/or a polarizer. The anti-reflection layer UM-1 may include a polarizing film or color filters. The color filters may have a predetermined arrangement. The arrangement of the color filters may be determined in consideration of the light-emitting colors of the pixels included in the display panel DP. The anti-reflection layer UM-1 may further include a partition layer adjacent to the color filters.

The input sensor UM-2 may include a plurality of sensing electrodes (not illustrated) for sensing an external input, trace lines (not illustrated) connected to the plurality of sensing electrodes, and an inorganic layer and/or an organic layer for insulating/protecting the plurality of sensing electrodes or the trace lines. The input sensor UM-2 may be a capacitive sensor, but is not particularly limited thereto.

The input sensor UM-2 may be formed (or provided) directly on the display panel DP, such as directly on a thin film encapsulation layer thereof, through a continuous process when the display panel DP is manufactured (or provided). However, the embodiment of the invention is not limited thereto, and the input sensor IS may be manufactured as a panel separate from the display panel DP and then attached to the display panel DP by an adhesive layer.

Figure 4:
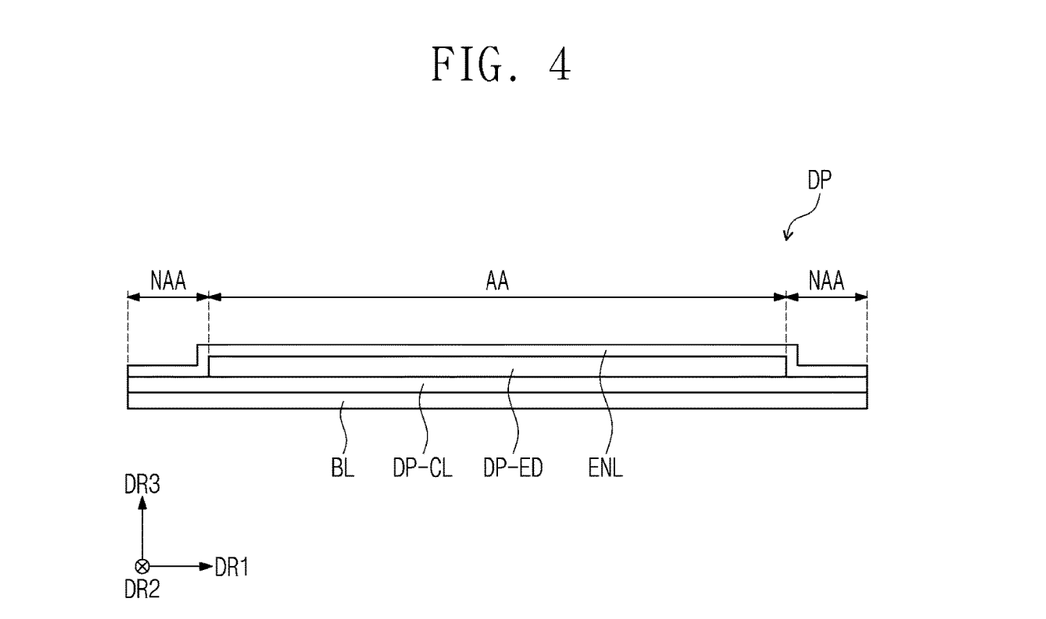
FIG. 4 is a cross-sectional view of a display panel according to an embodiment of the invention.

FIG. 4 is a cross-sectional view of a display panel DP according to an embodiment of the invention.

In an embodiment of the invention, the display panel DP includes a base substrate BL, a circuit layer DP-CL disposed on the base substrate BL, a light-emitting element layer DP-ED, and an encapsulation layer ENL. The base substrate BL may include a plastic substrate, a glass substrate, a metal substrate, an organic/inorganic composite substrate, or the like. For example, the base substrate BL may include at least one polyimide layer.

The circuit layer DP-CL includes at least one insulating layer, semiconductor patterns, and conductive patterns. The insulating layer includes at least one inorganic layer and at least one organic layer. The semiconductor patterns and the conductive patterns may constitute signal lines, a pixel driving circuit, and a scan driving circuit. In addition, the circuit layer DP-CL may include a rear-surface metal layer.

The light-emitting element layer DP-ED includes a display element, for example, a light-emitting element. For example, the light-emitting element may be an organic light-emitting element, a quantum dot light-emitting element, a micro LED light-emitting element, or a nano LED light-emitting element. The light-emitting element layer DP-ED may further include an organic layer such as a pixel defining film.

The light-emitting element layer DP-ED may be disposed in the display region AA. The non-display region NAA may be disposed outside the display region AA such as to surround the display region AA, and a light-emitting element may not be disposed in the non-display region NAA such that a display element is excluded from the non-display region NAA.

The encapsulation layer ENL may be disposed on and cover the light-emitting element layer DP-ED. The encapsulation layer ENL may be disposed on the circuit layer DP-CL to seal the light-emitting element layer DP-ED. The encapsulation layer ENL may be a thin film encapsulation layer including a plurality of organic and inorganic thin films. The encapsulation layer ENL may include a thin film encapsulation layer including a stacked structure of an inorganic layer/an organic layer/an inorganic layer. The stacked structure of the encapsulation layer ENL is not particularly limited.

Figure 5:
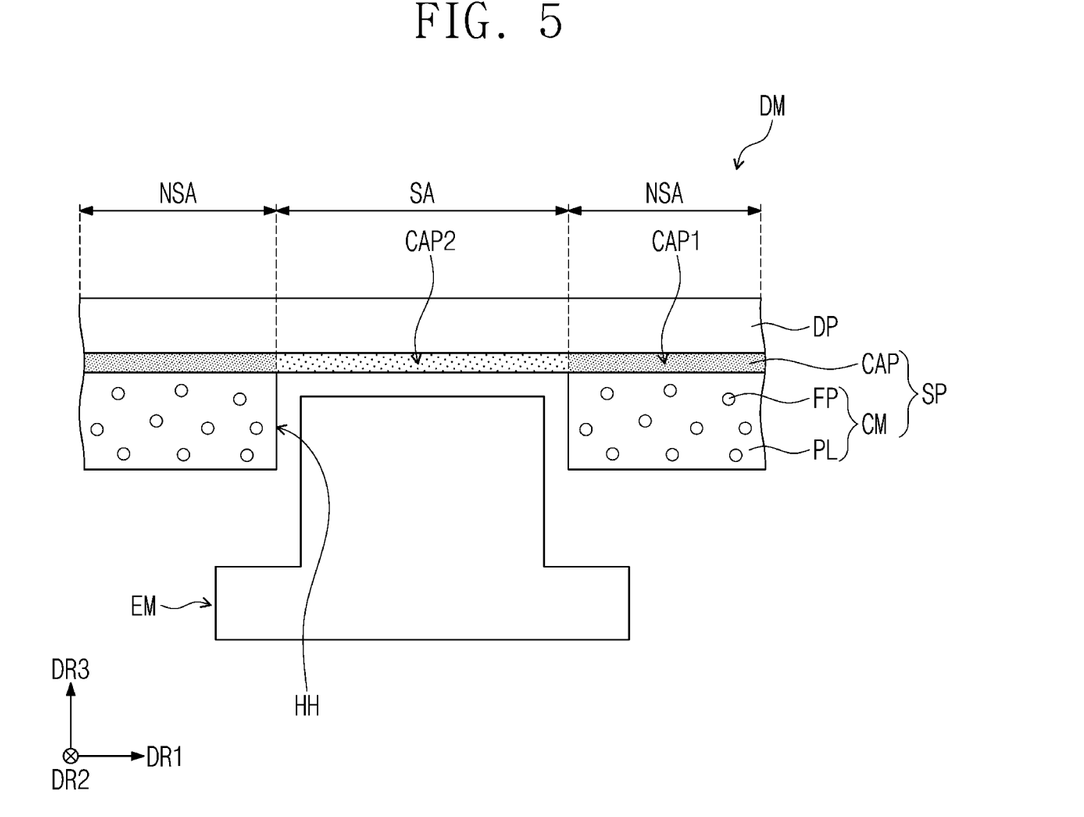
FIG. 5 is an enlarged cross-sectional view of the electronic device according to an embodiment of the invention.
Figure 6:
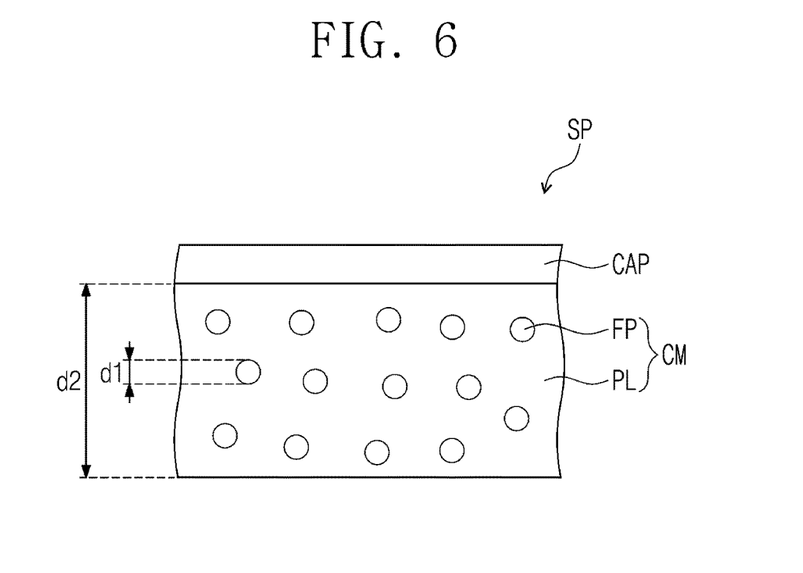
FIG. 6 is an enlarged cross-sectional view of a lower member according to an embodiment of the invention.

FIG. 5 is an enlarged cross-sectional view illustrating portions of a display module DM and an electronic module EM. FIG. 6 is an enlarged cross-sectional view illustrating a lower member SP included in the display module DM.

Referring to FIG. 5, the electronic device according to an embodiment of the invention may include a display module DM and an electronic module EM.

A hole HH may be defined in the display module DM. The hole HH may be defined in a region corresponding to the electronic module EM. The hole HH may be defined in a portion of the display module DM which overlaps the second region SA. Portions of the display module DM define the hole HH, where the portions define a sidewall of a layer of the display module DM. In an embodiment of the invention, the display module DM may have a single one of the hole HH or a plurality of holes HH defined therein. The hole HH may be a sensor hole H-S or a camera hole H-C illustrated in FIG. 2.

FIG. 5 illustrates that the hole HH of the display module DM is defined only in (and by portions of) the lower member SP, but the embodiment of the invention is not limited thereto, and a predetermined opening may be additionally defined in the display panel DP to overlap with or correspond to the hole HH. Alternatively, a respective hole among the plurality of holes HH may be defined only in the lower member SP, and another hole among the remaining holes may be defined in both the lower member SP and the display panel DP. Accordingly, the function of each of the electronic modules EM according to an embodiment of the invention may be performed.

The hole HH may overlap (or correspond to) a location of the electronic module EM. At least a portion of the electronic module EM may be disposed within the hole HH. For example, the electronic module EM may be a camera module CAM including a lens and adjacent to a side of the display panel DP. In an embodiment of the invention, the lens of the camera module CAM may be extended into the hole HH.

Referring to FIGS. 5 and 6, the display module DM may include a display panel DP and a lower member SP. The display module DM may be composed of the display panel DP together with the lower member SP. The lower member SP may be disposed directly below the display panel DP.

The lower member SP includes an adhesive layer CAP and a functional layer CM. The functional layer CM may be attached to the display panel DP by the adhesive layer CAP. The lower member SP may be composed of the adhesive layer CAP together with the functional layer CM. That is, only the adhesive layer CAP and the functional layer CM may be disposed below the display panel DP. Accordingly, the thickness of the electronic device ED may be reduced and the parts thereof may be simplified.

The adhesive layer CAP may be disposed directly below the display panel DP. The adhesive layer CAP may couple the display panel DP and the functional layer CM to each other. The adhesive layer CAP may include a first adhesive portion CAP1 disposed to overlap the first region NSA, and a second adhesive portion CAP2 disposed to overlap the second region SA. Although not illustrated, in another embodiment of the invention, the adhesive layer CAP may be composed of only the first adhesive portion CAP1 disposed to overlap the first region NSA, where the second adhesive portion CAP2 is omitted. The adhesive layer CAP may not overlap the second region SA.

The adhesive layer CAP may contain a transparent material. The adhesive layer CAP may include a pressure sensitive adhesive film (PSA) or an optically clear adhesive member (OCA). Accordingly, light output or received from the inside or outside of the electronic device may pass through the adhesive layer CAP.

The adhesive strength of the first adhesive portion CAP1 is higher than that of the second adhesive portion CAP2. After the first adhesive portion CAP1 and the second adhesive portion CAP2 are formed (or provided) of a same material at the time of manufacturing the electronic device ED, the adhesive strength of the second adhesive portion CAP2 may become relatively lower than that of the first adhesive portion CAP1 through a manufacturing process. That is, the first adhesive portion CAP1 and the second adhesive portion CAP2 may be respective portions or patterns of a same material layer. As being in a same layer, elements may be formed in a same process and/or as including a same material as each other, elements may be respective portions of a same material layer, elements may be on a same layer by forming an interface with a same underlying or overlying layer, etc., without being limited thereto. In another embodiment of the invention, the first adhesive portion CAP1 may be formed of a material having a higher adhesive strength than a material of the second adhesive portion CAP2 at the time of manufacturing.

The functional layer CM may be disposed directly below the adhesive layer CAP. The functional layer CM may be attached to the lower surface of the display panel DP by the adhesive layer CAP. The functional layer CM may be disposed to overlap the first region NSA and may be disposed not to overlap the second region SA. As not overlapping, elements may be adjacent to each other and/or spaced apart from each other. The functional layer CM may be disposed below the first adhesive portion CAP1 and may not be disposed below the second adhesive portion CAP2. The aforementioned hole HH may be defined in a portion of the second region SA in which the functional layer CM is not disposed.

The functional layer CM includes a base layer PL and a filler FP provided in plural including a plurality of fillers FP. The functional layer CM may be a single layer composed of the base layer PL and the plurality of fillers FP. The plurality of fillers FP may be dispersed in the base layer PL.

As the functional layer CM includes the base layer PL and the plurality of fillers FP, it may perform multiple functions in the electronic device ED. For example, the functional layer CM may support the display panel DP to define a supporting layer. The functional layer CM may protect the display panel DP and the electronic module EM from a physical impact applied from the outside of the electronic device ED to define an impact-absorbing layer. The functional layer CM may perform a heat dissipation function of dissipating heat generated from the display panel DP or the like to define a heat-dissipating layer. The functional layer CM may have a function such as electromagnetic wave shielding to define a shielding layer. However, the embodiment of the invention is not limited thereto, and the functional layer CM may additionally perform other functions in the electronic device ED according to the characteristics such as thickness and material of the functional layer CM. In an embodiment, for example, the functional layer CM which is directly below the first adhesive portion CAP1 may define or include a supporting layer which supports the display panel, an impact-absorbing layer, a heat-dissipating layer or an electromagnetic shielding layer.

The base layer PL may be a layer which provides a base material in which a plurality of fillers FP are dispersed. The base layer PL may include an organic material. The base layer PL may be formed by including at least one of an acrylic-based polymer, a urethane-based polymer, a silicone-based polymer and an imide-based polymer. The base layer PL may include a material having a predetermined strength.

Each of the plurality of fillers FP may include an organic material or an inorganic material. For example, each of the fillers FP may include graphite or metal particles. Each of the plurality of fillers FP may include a same material or different materials. Accordingly, the functional layer CM may perform a plurality of functions such as heat dissipation and shielding for the electronic device ED.

An average diameter $d1$ of the plurality of fillers FP may be about 10 micrometers to about 70 micrometers. For example, the average diameter $d1$ of the plurality of fillers FP may be about 40 micrometers to about 70 micrometers. Although FIG. 6 exemplarily illustrates that the fillers FP have a same diameter, the embodiment of the invention is not limited thereto, and the fillers FP may substantially have a polydisperse distribution obtained by mixing a plurality of particles having a monodisperse size distribution or a monodisperse distribution.

The plurality of fillers FP may have a content of about 30 weight percent (wt %) to about 80 wt % of the total weight of the functional layer CM. For example, the plurality of fillers FP may have a content of about 50 wt % to about 80 wt % of the total weight of the functional layer CM.

A thickness $d2$ of the functional layer CM may be about 50 micrometers to about 300 micrometers. The thickness $d2$ may represent a maximum thickness of the functional layer CM. The viscosity of the functional layer CM may be about 10,000 centipoise (cps) to about 100,000 cps. For example, the viscosity of the functional layer CM may be about 10,000 cps to about 50,000 cps. Accordingly, the functional layer CM may support the display panel DP and the like in the electronic device ED. In an embodiment, for example, the functional layer CM which is directly below the first adhesive portion CAP1 and includes the plurality of fillers FP which have the average diameter of about 10 micrometers to about 70 micrometers defines the thickness $d2$. The functional layer CM may define an enclosed hole corresponding to the second region SA of the display panel DP, and has a viscosity of about 10,000 centipoise to about 100,000 centipoise together with having a plurality of fillers FP which are in a base layer PL and have an average diameter of about 10 micrometers to about 70 micrometers.

By including a single functional layer below the display panel DP which is configured to perform multiple functions, the electronic device ED according to an embodiment of the invention may achieve the effects of reducing the thickness of the electronic device ED and the display module DM and simplifying the parts thereof. As having multiple functions, materials or characteristics which provide a respective function are contained within the thickness of the single functional layer.

As the display panel DP includes a light-emitting element, various side effects occur, and in order to compensate for this, a typical electronic device includes a plurality of members below the display panel DP such as a shielding layer, a heat dissipation layer, a cushion layer, and a support layer. In contrast, in one or more embodiment of the invention, by disposing a single layer (e.g., a monolayer) including a plurality of fillers, which performs the above functions, it is possible not only to perform functions which were traditionally performed by a plurality of layers, but also to achieve the effects of reducing thickness, simplifying parts, and improving manufacturing process efficiency.

In addition, in the electronic device ED according to an embodiment of the invention, by weakening the adhesive strength of a portion corresponding to the electronic module EM among areas of the adhesive layer CAP disposed between the display panel DP and the functional layer CM, the efficiency of a method of manufacturing (or providing) the electronic device ED may be improved. Specifically, as the adhesive strength of a portion of the adhesive layer CAP in the electronic module region is weakened, a portion of the functional layer CM in the electronic module region are weakly adhered to the display panel DP, so that the portion of the functional layer CM may be easily removed from the display panel hereafter. Therefore, according to the method of manufacturing the electronic device ED according to an embodiment of the invention, although one functional layer has a predetermined thickness and high viscosity and includes a plurality of fillers FP, the manufacturing thereof may be easy and the process thereof may be simplified.

Hereinafter, the method of manufacturing (or providing) the electronic device ED according to an embodiment of the invention will be described with reference to the drawings.

Figure 7:
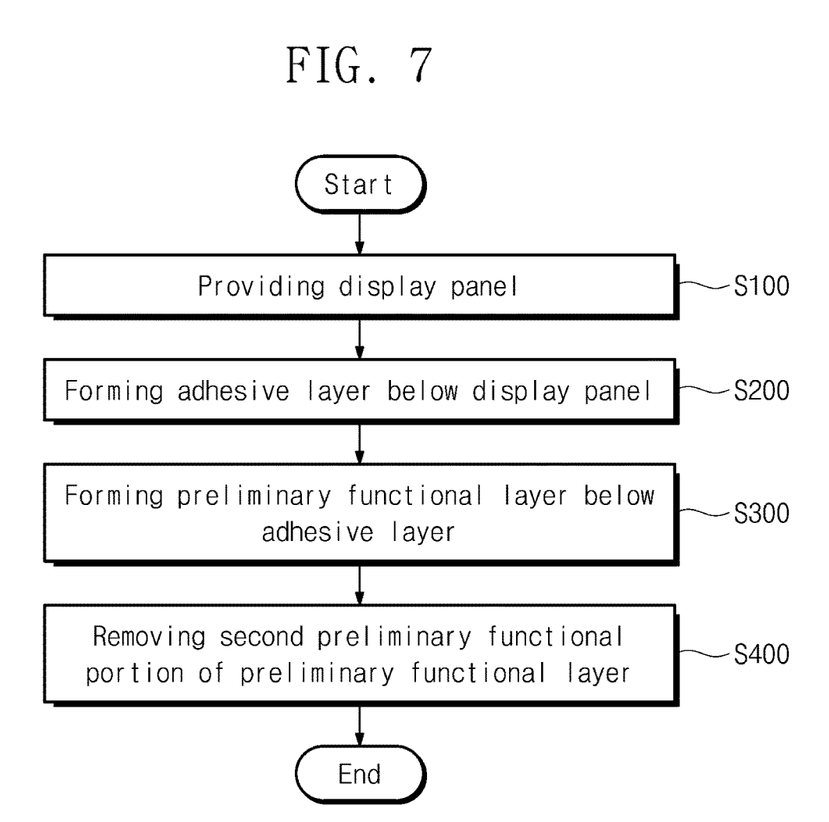
FIG. 7 is a flowchart showing a method of manufacturing an electronic device according to an embodiment of the invention.

FIG. 7 is a flowchart showing the method of manufacturing the electronic device ED according to an embodiment of the invention. FIG. 8A to 8E are enlarged cross-sectional views illustrating processes and intermediate structure within the method of manufacturing the electronic device ED according to an embodiment of the invention. FIG. 9 is an exploded perspective view of an intermediate structure of a display module DM within the method of manufacturing the electronic device ED according to an embodiment of the invention.

Referring to FIG. 7, the method of manufacturing the electronic device according to the invention includes providing a display panel DP (S100), forming an adhesive layer CAP below the display panel DP (S200), forming a preliminary functional layer below the adhesive layer CAP (S300), and removing a second preliminary functional portion of the preliminary functional layer (S400). In an embodiment, for example, the method may include providing a display panel DP including a first region NSA, a second region SA which is adjacent to the first region NSA and corresponding to an electronic module EM providing a function to the electronic device ED, and a lower surface corresponding to both the first region NSA and the second region SA, providing, on the lower surface of the display panel DP, an adhesive layer CAP a first adhesive portion CAP1 which overlaps the first region NSA and has a first adhesive strength, a second adhesive portion CAP2 which overlaps the second region SA and has a second adhesive strength which is lower than the adhesive strength of the first adhesive portion CAP2, and a lower surface corresponding to the first adhesive portion CAP1 and the second adhesive portion CAP2, providing, on the lower surface of the adhesive layer CAP, a preliminary functional layer PCM including a first preliminary functional portion P-CM1 overlapping the first region NSA, and a second preliminary functional portion P-CM2 overlapping the second region SA, and removing the second preliminary functional portion P-CM2 from the lower surface of the adhesive layer CAP to provide the first preliminary functional portion P-CM1 as a functional layer CM of the electronic device ED which is directly below the first adhesive portion CAP1.

Figure 8A:
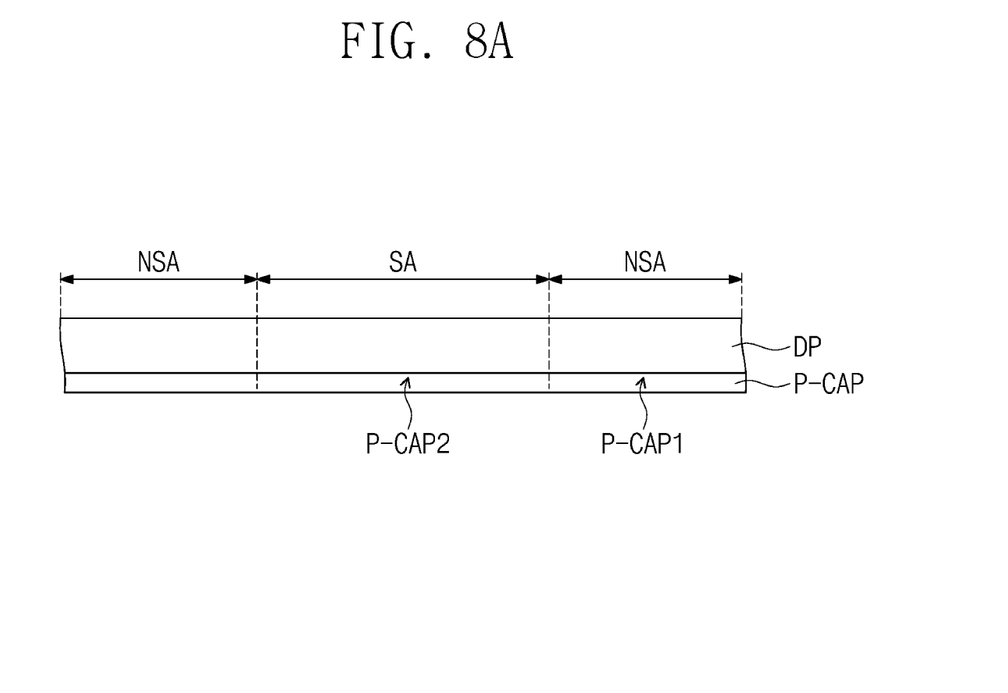
FIG. 8A to 8E are enlarge cross-sectional views illustrating processes in a method of manufacturing (or providing) the electronic device according to an embodiment of the invention.
Figure 9:
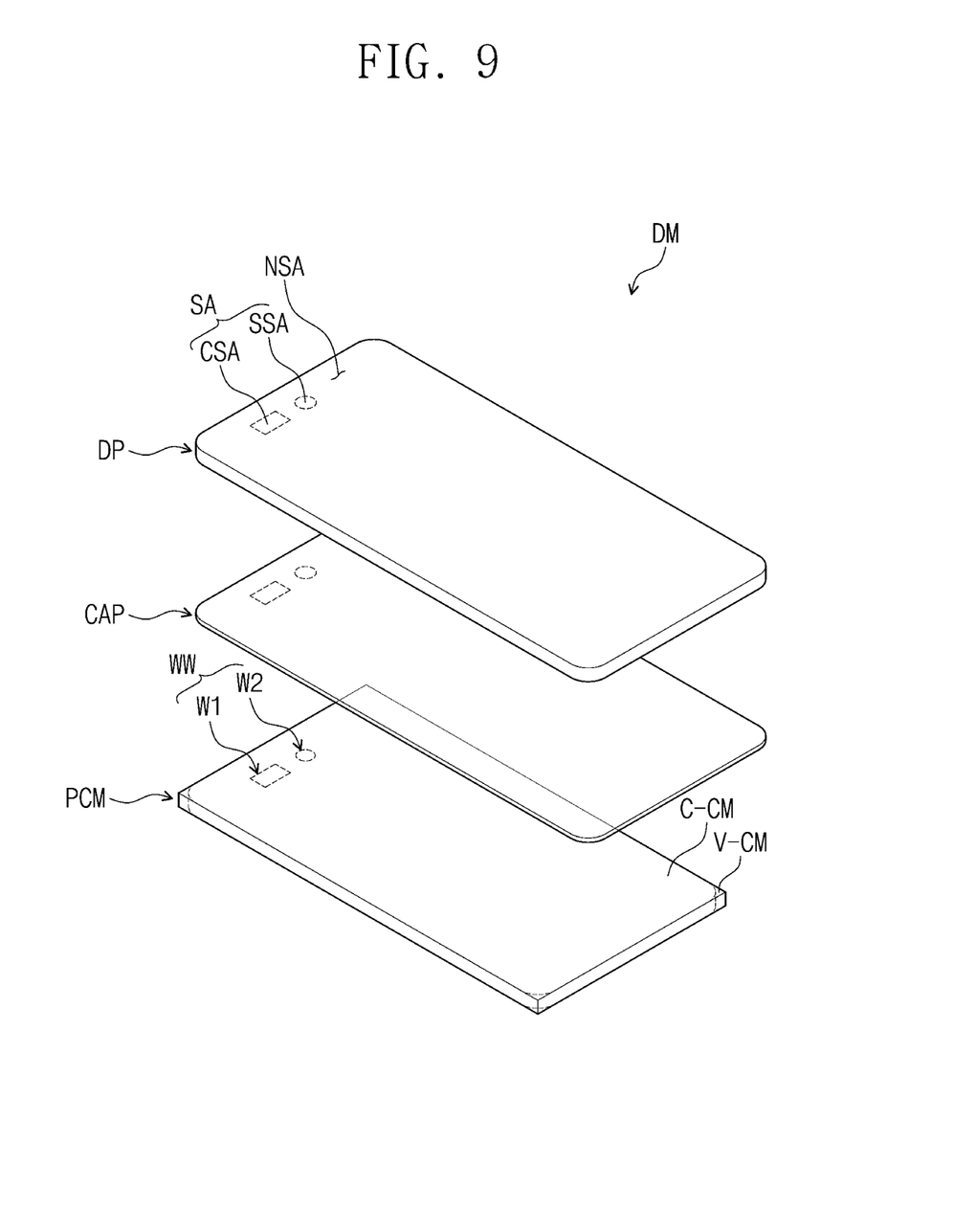
FIG. 9 is an exploded perspective view of an intermediate structure of a display module in a method of manufacturing (or providing) the electronic device according to an embodiment of the invention.

Referring to FIG. 8A, the method of manufacturing (or providing) the electronic device ED according to the invention includes providing a display panel DP. The display panel DP includes a first region NSA and a second region SA. The second region SA extends from the first region NSA to be non-overlapping (or adjacent) thereto, and in the electronic device ED, the electronic module EM is disposed to overlap (or correspond to) the second region SA as illustrated in FIG. 5.

Figure 8B:
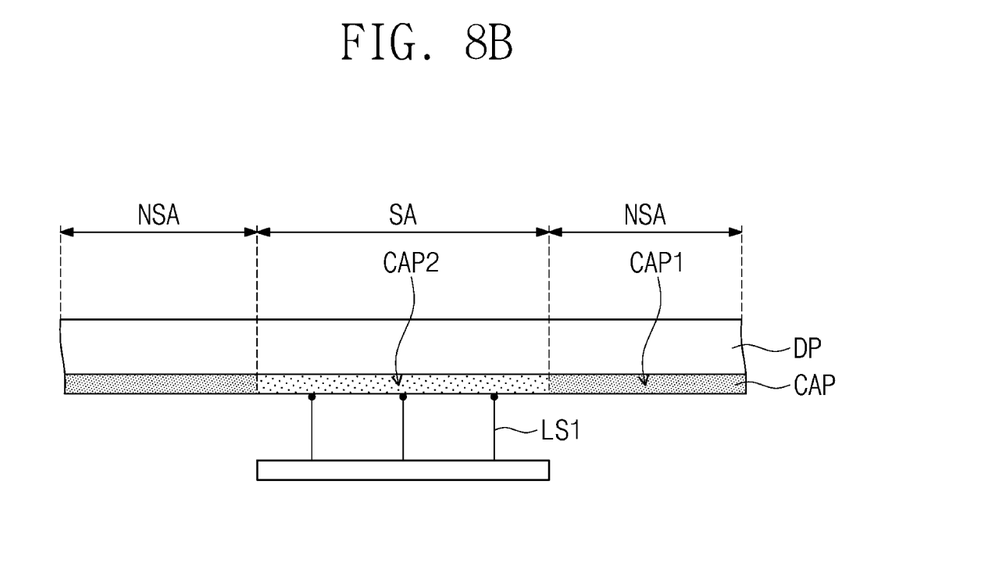

Referring to FIG. 8B, the method of manufacturing the electronic device ED according to an embodiment of the invention includes forming an adhesive layer CAP below the display panel DP. The adhesive layer CAP may be attached to the display panel DP, at the lower surface of the display panel DP. The lower surface may be a major surface which is furthest from the window WM, such as facing a direction opposite to an image-display or light-emitting direction (e.g., in the third direction DR3). Accordingly, the adhesive layer CAP may be disposed directly below the display panel DP.

The adhesive layer CAP includes a first adhesive portion CAP1 formed to overlap (or correspond to) the first region NSA, and a second adhesive portion CAP2 formed to overlap the second region SA. The adhesive strength of the first adhesive portion CAP1 is higher than that of the second adhesive portion CAP2. As the first adhesive portion CAP1 has a relatively high adhesive strength compared to the second adhesive portion CAP2, the adhesive strength between a first preliminary functional portion P-CM1 (see FIG. 8C) to be described later and the display panel DP may be higher than the adhesive strength between a second preliminary functional portion P-CM2 (see FIG. 8C) to be described later and the display panel DP.

Referring back to FIG. 8A, the forming of the adhesive layer CAP may include forming a preliminary adhesive layer P-CAP. The preliminary adhesive layer P-CAP may be formed to overlap an entirety of the first region NSA and the second region SA. The preliminary adhesive layer P-CAP may include a first preliminary adhesive portion P-CAP1 overlapping the first region NSA, and a second preliminary adhesive portion P-CAP2 overlapping the second region SA. The first preliminary adhesive portion P-CAP1 and the second preliminary adhesive portion P-CAP2 may be formed of a same material through one process. The first preliminary adhesive portion P-CAP1 and the second preliminary adhesive portion P-CAP2 may have a same adhesive strength as each other.

Referring to FIG. 8B, the forming of the adhesive layer CAP may include forming the preliminary adhesive layer P-CAP, and forming the second adhesive portion CAP2 by weakening the adhesive strength of the preliminary adhesive layer P-CAP at the second preliminary adhesive portion P-CAP2. That is, the forming of the adhesive layer CAP may include weakening only the adhesive strength of the preliminary adhesive layer P-CAP at the second preliminary adhesive portion P-CAP2. Accordingly, even though the first preliminary adhesive portion P-CAP1 and the second preliminary adhesive portion P-CAP2 are formed of a same material and have a same initial adhesive strength, the second adhesive portion CAP2 of the adhesive layer CAP may have a relatively low adhesive strength when compared to the first adhesive portion CAP1.

The weakening of the adhesive strength of a portion of the preliminary adhesive layer P-CAP in the forming of the second adhesive portion CAP2 may include irradiating a portion of the preliminary adhesive layer P-CAP which corresponds to the second preliminary adhesive portion P-CAP2 with a first light LS1 to weaken the adhesive strength of the preliminary adhesive layer P-CAP at the second preliminary adhesive portion P-CAP2. For example, the forming of the second adhesive portion CAP2 may include irradiating the lower surface of the preliminary adhesive layer P-CAP at the second preliminary adhesive portion P-CAP2 with the first light LS1 having a wavelength in the ultraviolet region.

In another embodiment of the method of manufacturing the electronic device ED according to the invention, the forming of the adhesive layer CAP may not include forming the preliminary adhesive layer P-CAP. The forming of the adhesive layer CAP may include forming each of the first adhesive portion CAP1 and the second adhesive portion CAP2 as separate layers or patterns and having different initial adhesive strengths. In an embodiment, for example, the method may include providing a first adhesive material on the lower surface of the display panel DP which corresponds to the first region NSA thereof, providing a second adhesive material which is different from the first adhesive material, on the lower surface of the display panel DP which corresponds to the second region thereof.

FIGS. 8A and 8B exemplarily illustrate that each of the first adhesive portion CAP1 and the second adhesive portion CAP2 is a different portion derived from one preliminary adhesive layer P-CAP, but the embodiment of the invention is not limited thereto, and the first adhesive portion CAP1 and the second adhesive portion CAP2 may be provided as portions having different adhesive strengths through separate processes. The forming of the first adhesive portion CAP1 and the forming of the second adhesive portion CAP2 may be performed simultaneously or at different times. The first adhesive portion CAP1 and the second adhesive portion CAP2 may be formed to contain different materials. The first adhesive portion CAP1 may be formed of a material having a higher adhesive strength than that of the second adhesive portion CAP2.

Figure 8C:
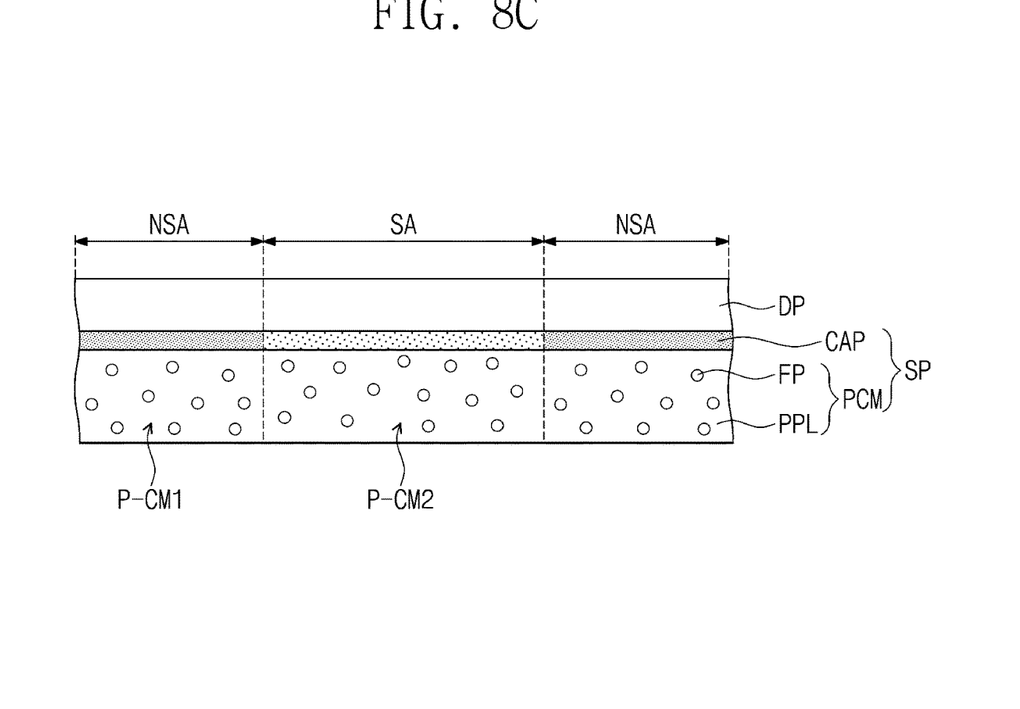

Referring to FIG. 8C, the method of manufacturing the electronic device ED according to an embodiment of the invention includes forming a preliminary functional layer PCM below the adhesive layer CAP.

The preliminary functional layer PCM may be attached to the lower surface of the adhesive layer CAP. The preliminary functional layer PCM may be formed to overlap an entirety of the first region NSA and the second region SA. The preliminary functional layer PCM may include a first preliminary functional portion P-CM1 overlapping the first region NSA, and a second preliminary functional portion P-CM2 overlapping the second region SA. The first preliminary functional portion P-CM1 and the second preliminary functional portion P-CM2 may be simultaneously formed and may be formed to contain a same material. The first preliminary functional portion P-CM1 and the second preliminary functional portion P-CM2 may be adjacent to each other on a plane, such as in a direction along the display panel DP.

The preliminary functional layer PCM may include a preliminary base layer PPL and a plurality of fillers FP. The viscosity of the preliminary functional layer PCM may be about 10,000 cps to about 100,000 cps. The thickness of the preliminary functional layer PCM may be about 50 micrometers to about 300 micrometers. The average diameter of the plurality of fillers FP may be about 10 micrometers to about 70 micrometers.

The forming of the preliminary functional layer PCM may be performed through a coating process. The forming of the preliminary functional layer PCM may be performed by at least any one of a spin coating method, a slit coating method, a jet printing method, a metal mask printing method and a screen printing method. For example, the forming of the preliminary functional layer PCM may be performed by a metal mask printing method or a screen printing method. Accordingly, although the preliminary functional layer PCM has the physical properties such as thickness and viscosity of the above-described numerical range, the preliminary functional layer PCM including the preliminary base layer PPL and the plurality of fillers FP may be attached to the lower surface of the adhesive layer CAP.

The preliminary functional layer PCM may contain a curable resin. The preliminary base layer PPL may contain a curable resin. The preliminary base layer PPL may be formed of a photocurable or thermocurable resin. The method of manufacturing the electronic device ED according to an embodiment of the invention may further include photocuring or thermosetting the preliminary functional layer PCM after the forming of the preliminary functional layer PCM to define a photocured or thermoset material.

Figure 8D:
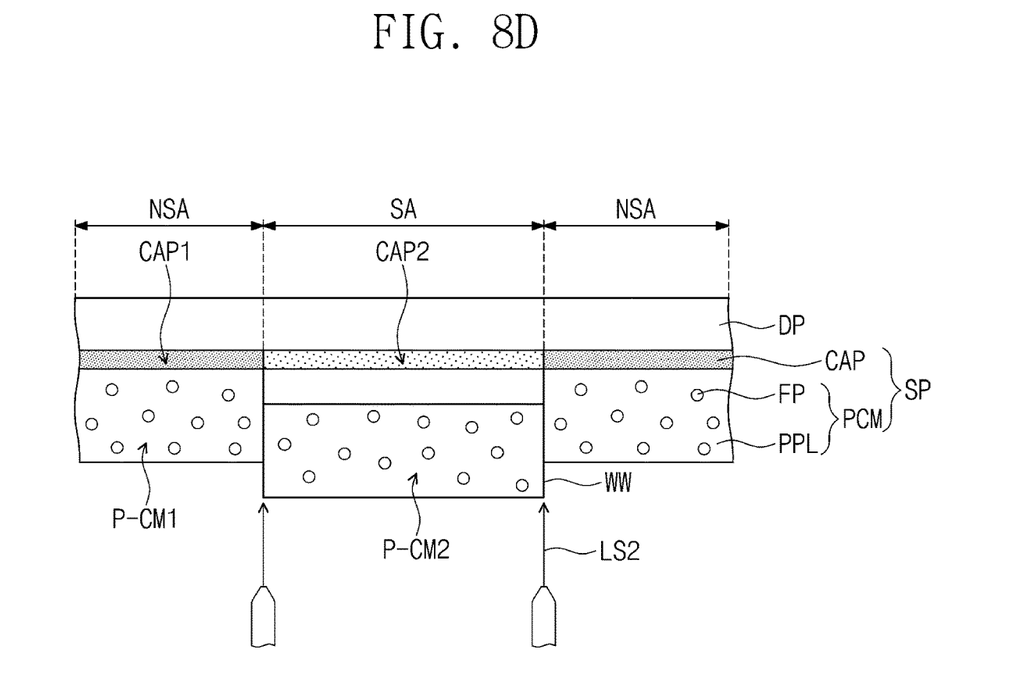

Referring to FIG. 8D, the method of manufacturing the electronic device ED according to an embodiment of the invention includes removing the second preliminary functional portion P-CM2 from the lower surface of the adhesive layer CAP and from a remainder of the preliminary functional layer PCM. The removing of the second preliminary functional portion P-CM2 may include removing the second preliminary functional portion P-CM2 from the lower surface of the second adhesive portion CAP2.

Referring to FIGS. 8D and 9, a hole boundary WW, which is a boundary between the first preliminary functional portion P-CM1 and the second preliminary functional portion P-CM2, may be defined in the preliminary functional layer PCM. The hole boundary WW may be a virtual line which divides the first preliminary functional portion P-CM1 and the second preliminary functional portion P-CM2 from each other. The hole boundary WW may correspond to the dividing line between the first region NSA and the second region SA of the display panel DP. The planar shape of the hole boundary WW may correspond to a planar shape of the second region SA, of the electronic module EM, etc. In an embodiment, for example, the functional layer CM which is directly below the first adhesive portion CAP1 defines an electronic module hole corresponding to the second adhesive portion CAP2, the second preliminary functional portion P-CM2 is adjacent to the first preliminary functional portion P-CM1 in a direction along the display panel DP, a boundary between the first preliminary functional portion P-CM1 and the second preliminary functional portion P-CM2 corresponds to the electronic module hole, and the removing of the second preliminary functional portion P-CM2 from the lower surface of the adhesive layer CAP includes irradiating the preliminary functional layer PCM at the boundary, with light.

The hole boundary WW may include a first hole boundary W1 corresponding to the region line of the first signal transmission region CSA of the display panel DP and a second hole boundary W2 corresponding to the region line of the second signal transmission region SSA of the display panel DP. FIG. 8D exemplarily illustrates that the hole boundary WW includes only the first hole boundary W1 and the second hole boundary W2, but the embodiment of the invention is not limited thereto, and a single hole boundary WW or three or more hole boundaries WW may be defined in the preliminary functional layer PCM.

FIG. 2 illustrates the hole HH as including an electronic module hole provided in plural including a plurality of individual electronic module holes. FIG. 9 illustrates the hole boundary WW as a plurality of individual boundaries. The plurality of electronic holes includes a first hole (e.g., the sensor hole H-S) and a second hole (e.g., the camera hole H-C). Each of the plurality of holes is an enclosed hole defined by portions of the lower member SP. The hole boundary WW and the corresponding hole HH which is formed by irradiating a light along the hole boundary WW described above, may correspond to an individual hole among the first hole and the second hole, without being limited thereto. In an embodiment, the hole boundary WW and the corresponding hole HH which is formed by irradiating a light along the hole boundary WW described above may correspond to more than one individual hole among the first hole and the second hole.

The removing of the second preliminary functional portion P-CM2 may include a method of irradiating the hole boundary WW with a second light LS2. The removing of the second preliminary functional portion P-CM2 may include a method of irradiating the hole boundary WW with a laser light to define the second light LS2. As the second light LS2 is irradiated along the hole boundary WW, a groove may be formed in the preliminary functional layer PCM and extended from the lower surface of the second preliminary functional portion P-CM2 adjacent to the first preliminary functional portion P-CM1. As the second light LS2 is irradiated along the hole boundary WW, the first preliminary functional portion P-CM1 and the second preliminary functional portion P-CM2 may be partially physically separated from each other.

Referring to FIG. 8D, the removing of the second preliminary functional portion P-CM2 may include providing the lower surface of the second preliminary functional portion P-CM2 with a pressure lower than a pressure applied to the lower surface of the first preliminary functional portion P-CM1. For example, the removing of the second preliminary functional portion P-CM2 may include performing a vacuum process at the lower surface of the second preliminary functional portion P-CM2. Alternatively, the removing of the second preliminary functional portion P-CM2 may include separating the second preliminary functional portion P-CM2 from the second adhesive portion CAP2 by attaching an adhesive tape to the lower surface of the second preliminary functional portion P-CM2 and applying a force in a thickness direction away from the adhesive layer CAP to pull the second preliminary functional portion P-CM2 away from the second adhesive portion CAP2. The adhesive tape may be attached to the lower surface of the second preliminary functional portion P-CM2 and may not be attached to the lower surface of the first preliminary functional portion P-CM1.

The removing of the second preliminary functional portion P-CM2 may include removing the second adhesive portion CAP2 from the lower surface of the display panel DP. That is, the second adhesive portion CAP2 and the second preliminary functional portion P-CM2 may be removed together with each other from the lower surface of the display panel DP. Here, the lower surface of the display panel DP may be exposed to outside the lower member SP. However, the embodiment of the invention is not limited thereto, and in another embodiment of the invention, the second adhesive portion CAP2 may remain attached to the lower surface of the display panel DP and form a part of the display panel DP (e.g., the display panel DP is considered as including the adhesive layer CAP). Alternatively, a thickness portion among a total thickness of the second adhesive portion CAP2 may be attached to the lower surface of the display panel DP and form a part thereof, and another thickness portion among the total thickness of the second adhesive portion CAP2 may be removed together with the second preliminary functional portion P-CM2 from the lower surface of the display panel DP.

Figure 8E:
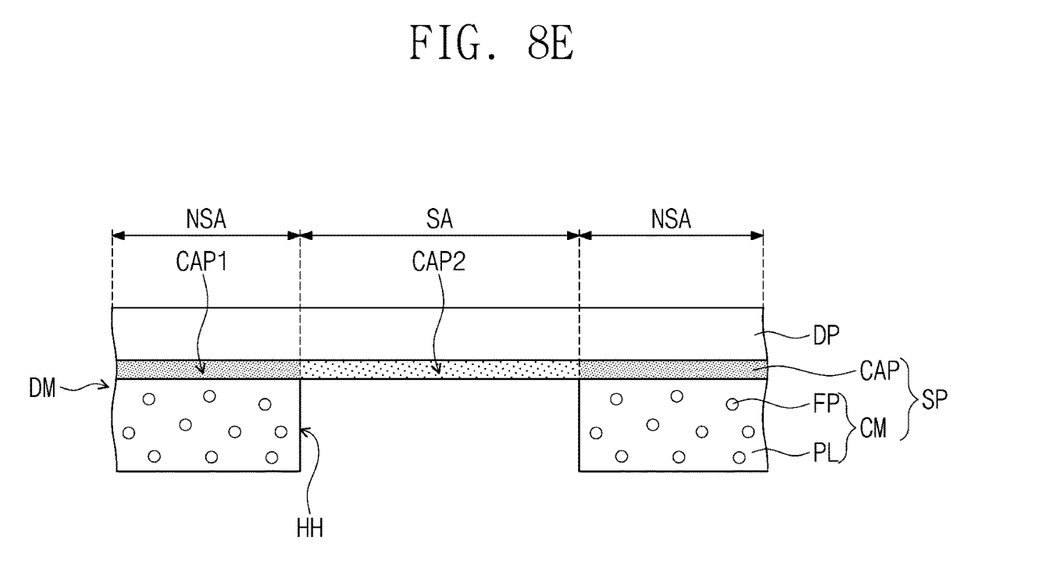

Referring to FIGS. 8D and 8E, as the second preliminary functional portion P-CM2 is removed, a hole HH may be defined in the second region SA. As the second preliminary functional portion P-CM2 is removed from the intermediate structure of the display module DM, the electronic module EM illustrated in FIG. 5 may be disposed corresponding to the hole HH, and the functional layer CM configured to perform multiple functions as described above may be finally provided. Accordingly, the electronic device ED according to an embodiment of the invention may achieve the effects of reducing thickness and simplifying parts, and even though the functional layer CM has a certain thickness and high viscosity and includes a plurality of fillers FP, the manufacturing thereof may be easy and the process thereof may be simplified.

Referring to FIG. 9, in another embodiment of the invention, the preliminary functional layer PCM may include a central portion C-CM corresponding to the shape of the display panel DP, and a corner portion V-CM which does not correspond to the display panel DP and is formed at a corner of the display panel DP. In an embodiment, for example, the preliminary functional layer PCM which is on the lower surface of the adhesive layer CAP includes the corner portion V-CM which extends further than the display panel DP, in a direction along the adhesive layer CAP.

Accordingly, the method of manufacturing the electronic device ED according to an embodiment of the invention may further include removing the corner portion V-CM. The removing of the corner portion V-CM may be performed in the same manner as the method of removing the aforementioned second preliminary functional portion P-CM2 (see FIG. 8D). However, the embodiment of the invention is not limited thereto, and in the method of manufacturing the electronic device ED according to the invention, as the preliminary functional layer PCM may be formed to have a round-shaped outer surface corresponding to the display panel DP through a separate metal mask, the separate corner portion V-CM may not be defined. That is, the preliminary functional layer PCM may be composed of only the central portion C-CM having a rounded corner.

As the electronic device ED according to the invention includes a single functional layer below the display panel DP, the number of functional members disposed below the display panel DP may be reduced, thereby making it possible to reduce the thickness of the electronic device ED and simplify the parts thereof. As the method of manufacturing the electronic device ED forms a single functional layer below the display panel DP, process efficiency may be improved.

Although the above has been described with reference to embodiments of the invention, those skilled in the art or those of ordinary skill in the art will understand that various modifications and changes can be made to the invention within the scope that does not depart from the spirit and technical field of the invention described in the claims to be described later. Accordingly, the technical scope of the invention should not be limited to the content described in the detailed description of the specification, but should be determined by the claims described hereinafter.

What is claimed is:

1. An electronic device comprising:
   an electronic module which provides a function to the electronic device;
   a display panel comprising a first region, and a second region which is adjacent to the first region and corresponds to the electronic module; and
   a lower member below the display panel, the lower member comprising:
   an adhesive layer comprising:
      a first adhesive portion which corresponds to the first region of the display panel and has an adhesive strength,
      a second adhesive portion which corresponds to the second region of the display panel and has an adhesive strength, and
      the adhesive strength of the first adhesive portion higher than the adhesive strength of the second adhesive portion, and
   a functional layer which is directly below the first adhesive portion, the functional layer comprising a plurality of fillers which are in a base layer and have an average diameter of about 10 micrometers to about 70 micrometers.

2. The electronic device of claim 1, wherein the functional layer which is directly below the first adhesive portion and comprises the plurality of fillers which have the average diameter of about 10 micrometers to about 70 micrometers defines an electronic module hole corresponding to the second adhesive portion.

3. The electronic device of claim 1, wherein the functional layer comprises the plurality of fillers which have the average diameter of about 10 micrometers to about 70 micrometers together with having a viscosity of about 10,000 centipoise to about 100,000 centipoise.

4. The electronic device of claim 1, wherein the functional layer which is directly below the first adhesive portion and comprises the plurality of fillers which have the average diameter of about 10 micrometers to about 70 micrometers defines a thickness of about 50 micrometers to about 300 micrometers.

5. The electronic device of claim 1, wherein within the functional layer which is directly below the first adhesive portion and comprises the plurality of fillers which have the average diameter of about 10 micrometers to about 70 micrometers, the base layer comprises an organic material.

6. The electronic device of claim 1, wherein the lower member is directly below the display panel.

7. The electronic device of claim 1, wherein the functional layer which is directly below the first adhesive portion comprises a supporting layer which supports the display panel, an impact-absorbing layer, a heat-dissipating layer or an electromagnetic shielding layer.

8. The electronic device of claim 1, wherein the electronic module is a camera module or a sensor module.

9. An electronic device comprising:
- an electronic module which provides a function to the electronic device;
- a display panel comprising a first region, and a second region which is adjacent to the first region and corresponds to the electronic module; and
- a lower member directly below the display panel, the lower member consisting of:
  - an adhesive layer directly below the display panel,
  - a functional layer which is directly below the adhesive layer, defines a hole corresponding to the second region of the display panel, and has a viscosity of about 10,000 centipoise to about 100,000 centipoise together with having a plurality of fillers which are in a base layer and have an average diameter of about 10 micrometers to about 70 micrometers.

* * * * *